(12) United States Patent
Ohzono et al.

(10) Patent No.: US 7,140,329 B2
(45) Date of Patent: Nov. 28, 2006

(54) VEHICLE

(75) Inventors: Gen Ohzono, Shizuoka (JP);
Yoshiharu Matsumoto, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/207,041

(22) Filed: Aug. 18, 2005

(65) Prior Publication Data

US 2006/0054372 A1 Mar. 16, 2006

(30) Foreign Application Priority Data

Sep. 13, 2004 (JP) .............................. 2004-265066

(51) Int. Cl.
*F01P 7/14* (2006.01)
*B62K 11/00* (2006.01)
*B60K 11/04* (2006.01)

(52) U.S. Cl. ..................... 123/41.1; 180/229; 180/68.4

(58) Field of Classification Search ............... 123/41.1, 123/41.44, 41.51, 41.49, 41.57; 180/229, 180/68.4, 68.6

See application file for complete search history.

(56) References Cited

U.S. PATENT DOCUMENTS 5,908,079 A * 6/1999 Amino ........................ 180/219

FOREIGN PATENT DOCUMENTS

JP 2000-037166 2/2002
JP 2002-037165 2/2002

* cited by examiner

*Primary Examiner*—Stephen K. Cronin
*Assistant Examiner*—Hyder Ali
(74) *Attorney, Agent, or Firm*—Keating & Bennett, LLP (57) ABSTRACT

A vehicle is capable of maintaining a cooling capacity of a heat exchanger constant. The vehicle includes ahead pipe, a main frame connected to the head pipe so as to extend rearwardly and downwardly, an engine arranged below the main frame and including a cylinder having a cylinder shaft, which is inclined forwardly and obliquely upward at a predetermined angle, leg shields that cover the front of legs of a driver of the vehicle, a radiator arranged within the leg shields to cool the engine, and a reservoir tank arranged below a lower surface of the cylinder of the engine within the leg shields and connected to the radiator.

13 Claims, 7 Drawing Sheets

VEHICLE

BACKGROUND OF THE INVENTION

1. Field of the Invention

The present invention relates to a vehicle, and more particularly, the present invention relates to a vehicle provided with a heat exchanger that cools an engine.

2. Description of the Related Art

Conventionally, motorcycles (vehicles) provided with a heat exchanger that cools an engine are known among underbone type motorcycles in which a frame (main frame) between a seat and a handle is decreased in height to make it easy for a driver to straddle (for example, see JP-A-2002-37165 and JP-A-2002-37166).

These patents disclose motorcycles in which a radiator (heat exchanger) for cooling an engine is provided in leg shields that cover the front of a driver's legs.

Since the underbone type motorcycles in these patents are not constructed so that a quantity of cooling water in the radiator is maintained constant at all times, there is a disadvantage in that a quantity of cooling water in the radiator is varied. Specifically, the quantity of the cooling water in the radiator is increased in the case where water temperature in the radiator rises causing the cooling water to expand in volume, and a quantity of the cooling water in the radiator is decreased in the case where water temperature in the radiator drops to cause the cooling water to contract in volume. In this manner, when a quantity of the cooling water in the radiator is varied according to water temperature, the radiator (heat exchanger) is also varied in cooling capacity so that it becomes difficult to maintain the cooling capacity of the radiator constant.

SUMMARY OF THE INVENTION

In order to overcome the problems described above, preferred embodiments of the present invention provide a vehicle that is capable of maintaining a cooling capacity of a heat exchanger constant.

According to a preferred embodiment of the present invention, a vehicle includes a head pipe, a frame connected to the head pipe extending rearwardly and downwardly, an engine arranged below the frame and including a cylinder having a cylinder shaft, which is inclined forward and obliquely upward at a predetermined angle, a leg shield that covers a front side of the legs of a driver of the vehicle, a heat exchanger arranged in the leg shield to cool the engine, and a reservoir tank arranged below a lower surface of the cylinder of the engine within the leg shield and connected to the heat exchanger.

With the vehicle of the present preferred embodiment, the reservoir tank enables temporary storage of cooling water when the cooling water is increased by virtue of the water temperature in the heat exchanger becoming high, and drawing of the cooling water from the reservoir tank to fill the heat exchanger in the case where the cooling water is decreased by virtue of the water temperature in the heat exchanger becoming low. As a result, the quantity of the cooling water in the heat exchanger can be maintained constant, so that the cooling capacity of the heat exchanger can be kept constant. Also, by arranging the engine having a cylinder shaft inclined forward and obliquely upward at a predetermined angle and below the frame, it is possible to arrange the reservoir tank below the lower surface of the cylinder of the engine and to prevent an outward projection of the reservoir tank from lateral end surfaces of the engine as viewed from the front of the vehicle. Thereby, an increase of the leg shield in length in the widthwise direction of the vehicle body can be restricted even when the leg shield is configured such that the reservoir tank is arranged within the leg shield.

Other features, elements, characteristics, and advantages of the present invention will be apparent from the following detailed description of preferred embodiments with reference to the attached drawings.

DETAILED DESCRIPTION OF PREFERRED EMBODIMENTS

Preferred embodiments of the present invention will be described below with reference to the drawings.

Figure 1:
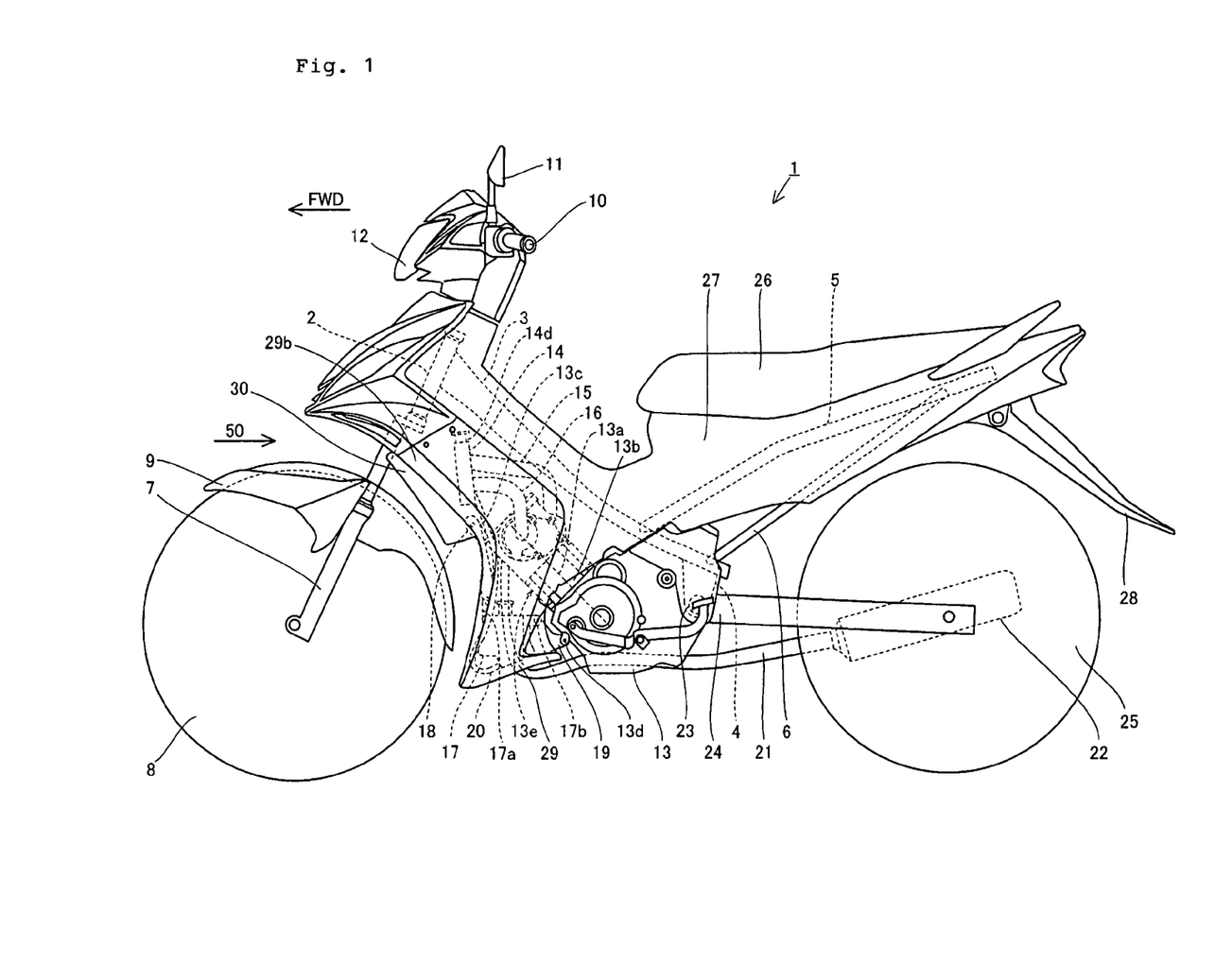
FIG. 1 is a side view showing a whole construction of a motorcycle according to a preferred embodiment of the present invention.
Figure 2:
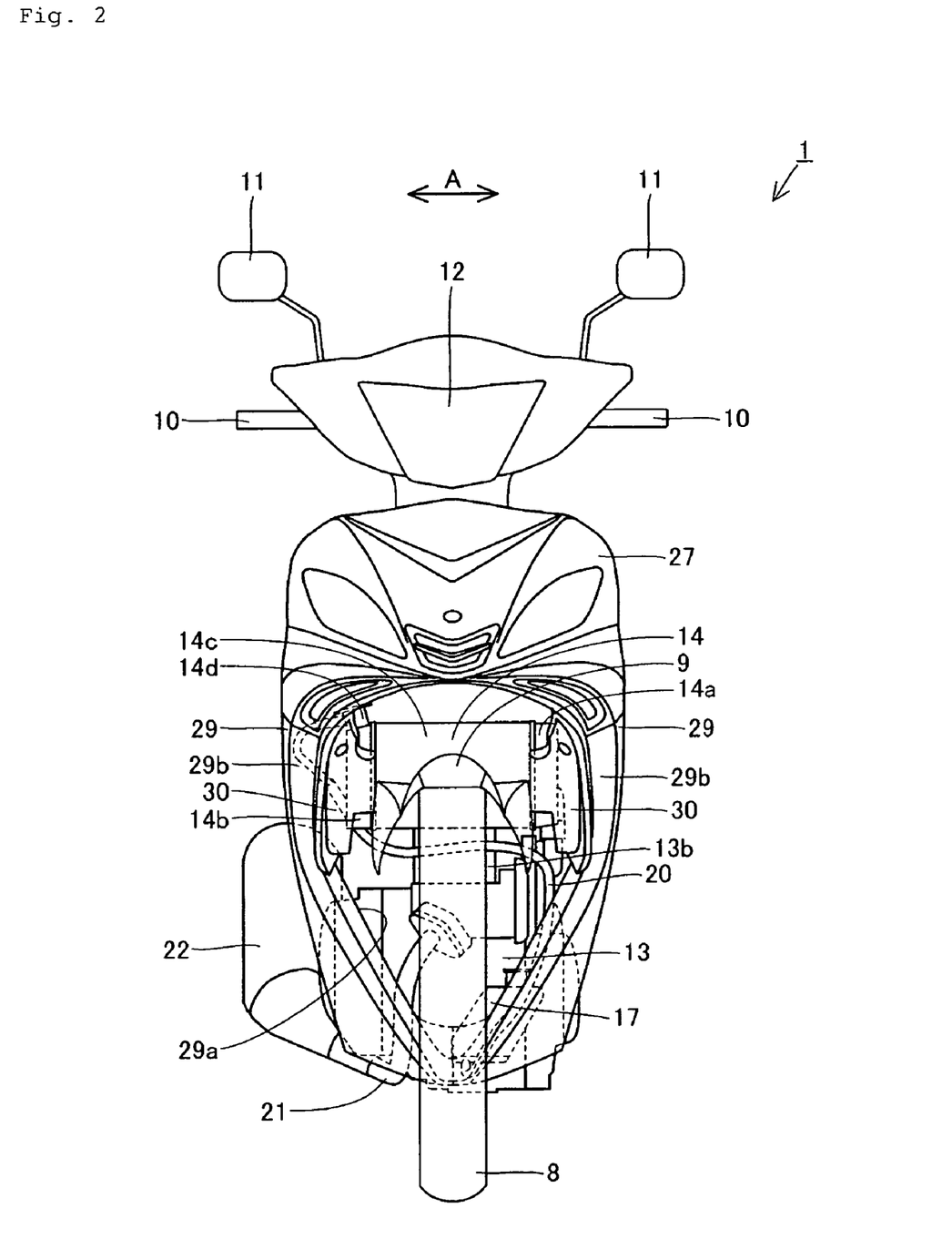
FIG. 2 is a front view showing the motorcycle, according to the preferred embodiment shown in FIG. 1.

FIG. 1 is a side view showing an overall construction of a motorcycle according to a preferred embodiment of the invention, and FIG. 2 is a front view showing the motorcycle according to the preferred embodiment shown in FIG. 1. FIGS. 3 to 7 are side views and front views showing an engine and its vicinity of the motorcycle according to the preferred embodiment shown in FIG. 1. In addition, FWD in the drawings indicates the forward traveling direction of the motorcycle. Also, the present preferred embodiment will be described with respect to an underbone type motorcycle, for example, in which a frame (main frame) between a seat and a handle is decreased in height to make it easy for a driver to straddle. The construction of the motorcycle according to the present preferred embodiment will be described below with reference to FIGS. 1 to 7.

With the underbone type motorcycle 1 according to a preferred embodiment of the present invention, a front end of a main frame 3 is connected to a head pipe 2 as shown in FIG. 1. In addition, the main frame 3 is an example of a "frame" in the present invention. The main frame 3 is arranged to extend rearwardly and downwardly. Also, a rear arm bracket 4 is connected to a rear end of the main frame 3. Also, connected to the main frame 3 is a seat rail 5 that extends rearwardly and upwardly. Also, a back stay 6 is connected between the rear end of the main frame 3 and a rear portion of the seat rail 5. A vehicle frame preferably includes of the head pipe 2, the main frame 3, the rear arm bracket 4, the seat rail 5, and the back stay 6.

A pair of front forks 7 is arranged below the head pipe 2. A front wheel 8 is rotatably mounted to the lower ends of the front forks 7. A front fender 9 is mounted above the front wheel 8 to cover an upper portion of the front wheel 8. Also, handles 10 are mounted to an upper portion of the head pipe 2 so as to be able to turn. As shown in FIGS. 1 and 2, a back mirror 11 is mounted inside the handles 10. A headlight 12 is arranged in front of and inwardly of the handle 10.

Mounted below the main frame 3 as shown in FIGS. 1, 3, 5, and 6 is an engine 13 including a cylinder 13b having a cylinder shaft 13a which is inclined forward and obliquely upward at a predetermined angle. Also, the engine 13 includes a mount part 13c provided on the cylinder 13b and a mount part 13d provided below the cylinder 13b of the engine 13.

Figure 7:
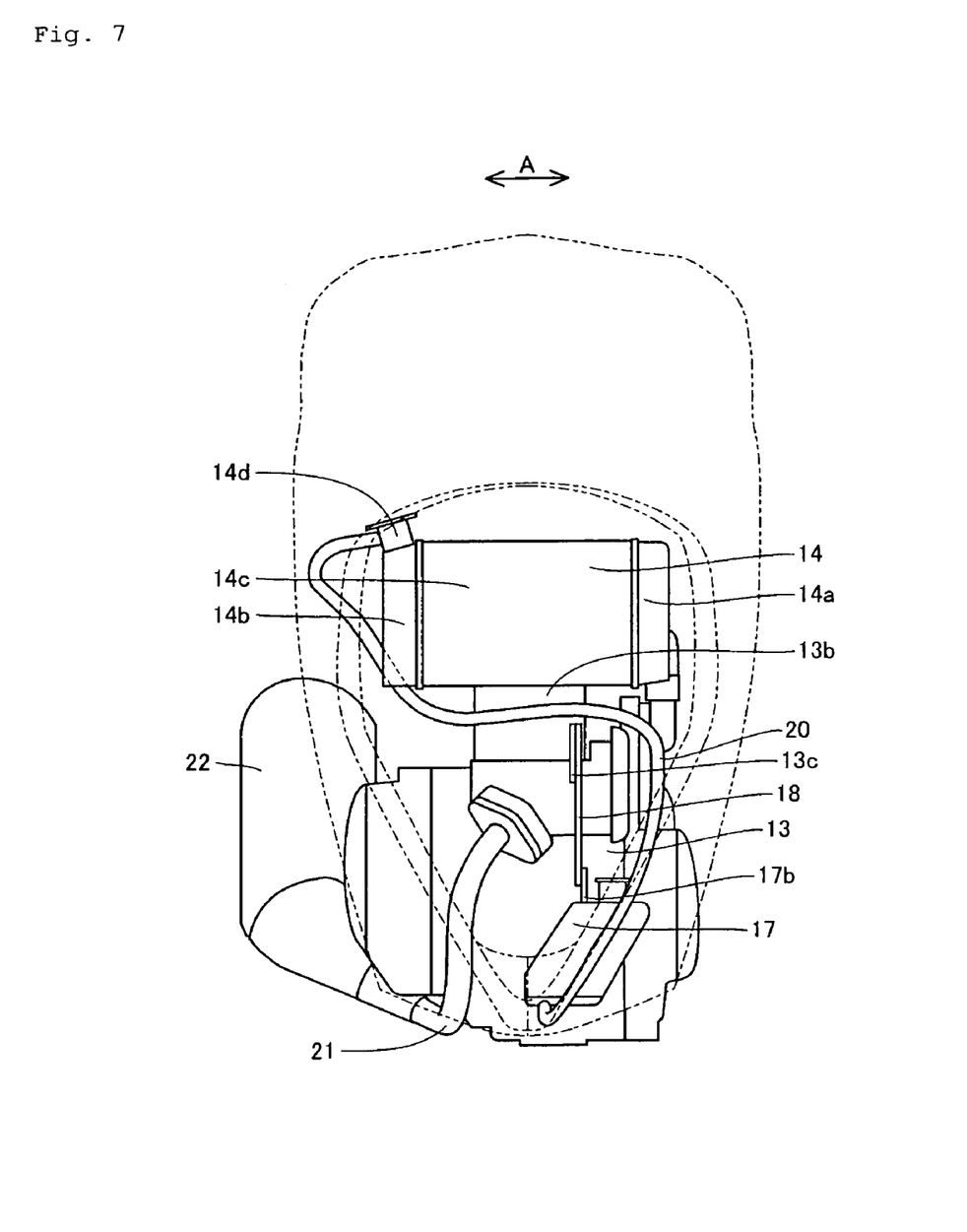
FIG. 7 is a front view showing the engine and its vicinity of the motorcycle, according to the preferred embodiment shown in FIG. 1 with the vehicle cover removed.

A radiator 14 that cools the engine 13 is mounted forwardly and upwardly of the engine 13 and below the main frame 3. A lower end of the radiator 14 is positioned above a lower surface 13e of the cylinder 13b of the engine 13. In addition, the radiator 14 is exemplary of a "heat exchanger" of the invention. The radiator 14 includes, as shown in FIGS. 2, 4, and 7, a pair of tanks 14a, 14b arranged with a predetermined spacing therebetween in a widthwise direction (A direction) of the motorcycle 1, and a core part 14c arranged between the pair of tanks 14a, 14b. The core part 14c is provided with a multiplicity of holes (not shown) through which a running wind 50 (see FIG. 1) passes. Also, mounted to the tank 14b is a cap 14d having a pressure regulating valve (not shown). The radiator 14 is connected to the engine 13 via a supply pipe 15 and a return pipe 16 as shown in FIGS. 1, 3, 5, and 6.

When the engine 13 is cooled by the radiator 14, a cooling water that cools the engine 13 and thereby becomes warm is first fed to the tank 14a (see FIGS. 2, 4, and 7) of the radiator 14 through the supply pipe 15. The cooling water having become warm is cooled by the core part 14c (see FIGS. 2, 4, and 7) of the radiator 14, and then fed to the tank 14b (see FIGS. 2, 4, and 7) of the radiator 14. The cooling water having been cooled is returned to the engine 13 through the return pipe 16. In addition, cooling (heat release) of the cooling water is conducted at the core part 14c of the radiator 14 by exposing the core part 14c to the running wind (air) 50 from the front and passing the running wind through the core part 14c when the motorcycle 1 travels.

Here, according to the present preferred embodiment, a reservoir tank (recovery tank) 17 is mounted, as shown in FIGS. 1 to 7, below the lower surface 13e of the cylinder 13b of the engine 13 and rightwardly of a center line of a vehicle body in the widthwise direction (A direction) of the vehicle body as viewed from the front. The reservoir tank 17 has the function of maintaining the quantity of the cooling water in the radiator 14 constant through storing a quantity of the cooling water as increased by virtue of the water in the radiator 14 becoming high in temperature, and drawing the cooling water from within the reservoir tank 17 with negative pressure to fill the radiator 14 when the cooling water is decreased by virtue of the water in the radiator 14 becoming low in temperature. Also, the reservoir tank 17 is preferably made of a translucent material that affords visually recognizing a quantity of the cooling water stored therein from the outside. Also, the reservoir tank 17 includes, as shown in FIGS. 1, 3, 5, and 6, a mount part 17a provided at an upper end thereof and extending upward, and a mount part 17b provided at a rearward, upper end thereof and extending rearward as viewed laterally. The mount part 17a of the reservoir tank 17 is mounted through a bracket 18 to the mount part 13c provided on the cylinder 13b of the engine 13, and the mount part 17b of the reservoir tank 17 is mounted through a bracket 19 to the mount part 13d provided below the cylinder 13b of the engine 13. In addition, the brackets 18, 19 are examples of a "mount member" of the present preferred embodiment.

The reservoir tank 17 is connected to the radiator 14 by a plumbing pipe 20. Specifically, as shown in FIGS. 2, 4, and 7, one end of the plumbing pipe 20 is connected to a lower end of the reservoir tank 17 provided rightwardly of the center line of the vehicle body as viewed from the front, and the other end of the plumbing pipe 20 is connected to the cap 14d of the radiator 14 provided leftwardly of the center line of the vehicle body as viewed from the front. Also, the plumbing pipe 20 is installed such that it extends upward from the lower end of the reservoir tank 17, extends horizontally along a lower surface of the radiator 14, and extends to the upper cap 14d. In addition, the plumbing pipe 20 is an example of "pipe" in the present preferred embodiment.

According to the present preferred embodiment, an exhaust pipe 21 is provided, as shown in FIGS. 1 to 7, one end of which is connected to the cylinder 13b of the engine 13, and which is bent leftward as viewed from the front and extends rearward. More specifically, as shown in FIGS. 2, 4, and 7, the exhaust pipe 21 is arranged on an opposite side of the center line of the vehicle body from the reservoir tank 17 arranged on a right side. The other end of the exhaust pipe 21 is connected to a muffler 22.

As shown in FIG. 1, the rear arm bracket 4 connected to the main frame 3 is provided with a pivot shaft 23. A rear arm 24 is pivotally mounted at a front end thereof to the pivot shaft 23 to be able to swing vertically. A rear wheel 25 is rotatably mounted on a rear end of the rear arm 24. A seat 26 is arranged above the seat rail 5. A vehicle body cover 27 is mounted over an extent from the front of the vehicle body to the rear thereof so as to cover the head pipe 2 and the seat rail 5. A rear fender 28 is mounted rearwardly of the vehicle body cover 27 in a direction (a direction indicated by an arrow FWD) of traveling to cover an upper portion of the rear wheel 25.

Figure 3:
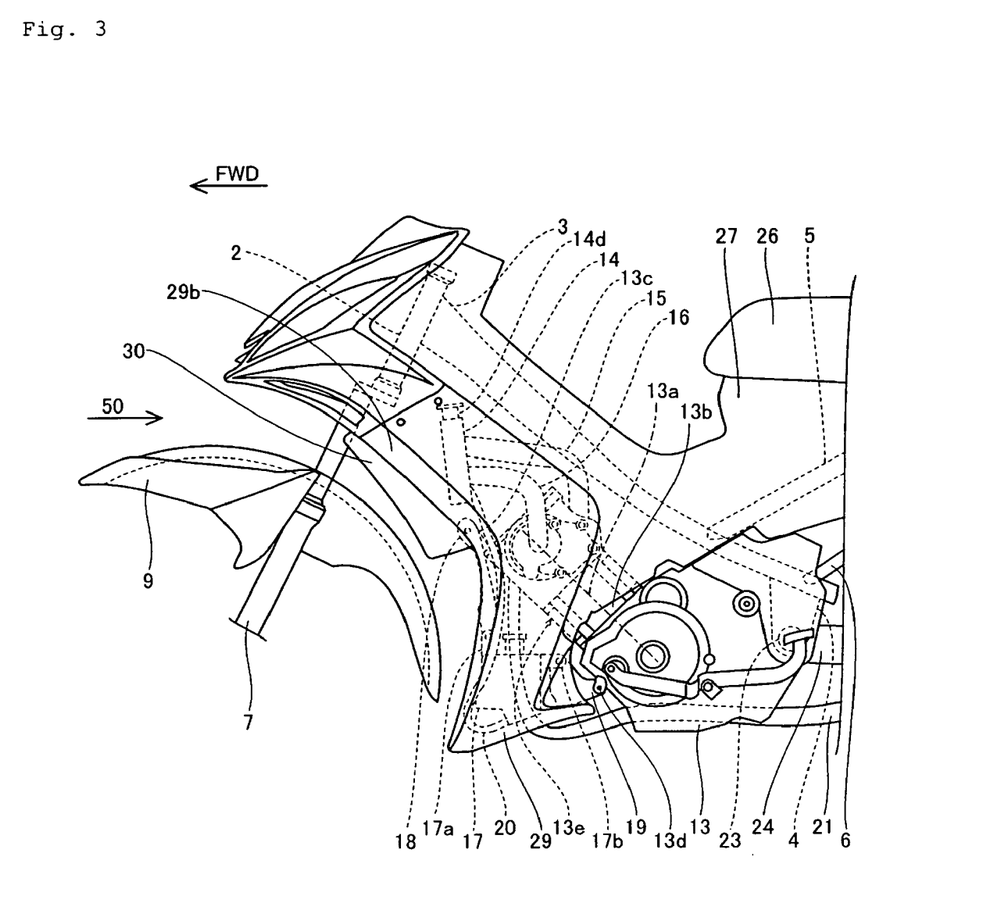
FIG. 3 is a side view showing an engine and its vicinity of the motorcycle, according to the preferred embodiment shown in FIG. 1.
Figure 4:
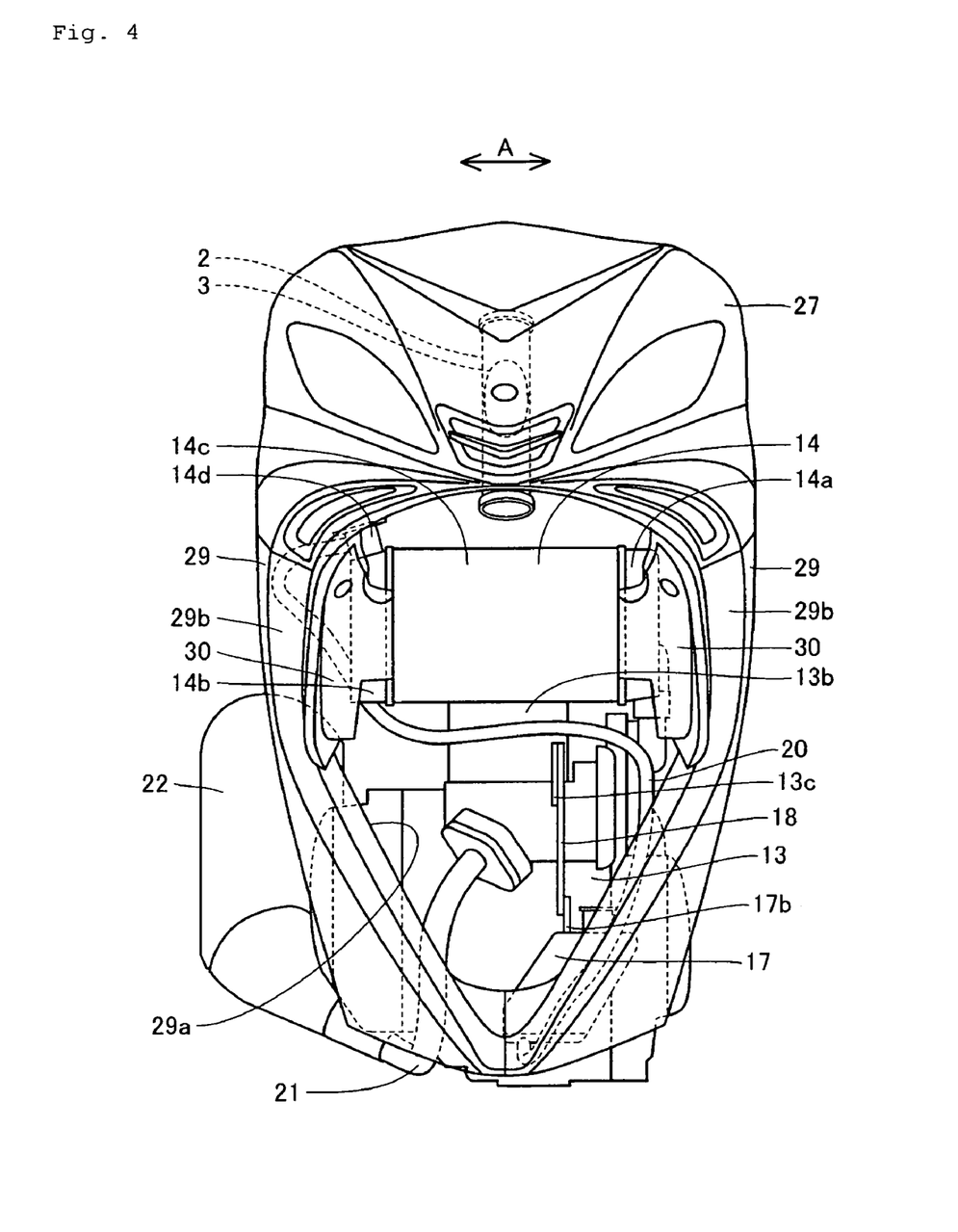
FIG. 4 is a front view showing the engine and its vicinity of the motorcycle, according to the preferred embodiment shown in FIG. 1.
Figure 5:
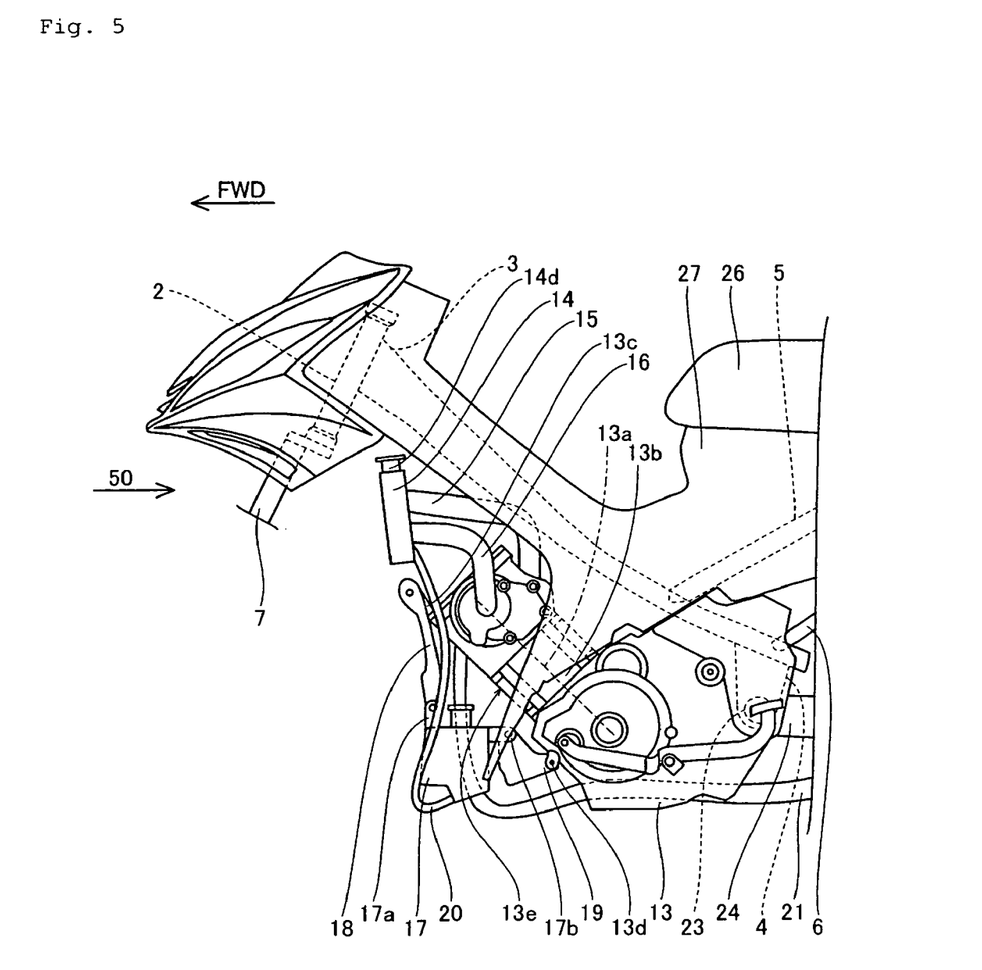
FIG. 5 is a side view showing the engine of the motorcycle, according to the preferred embodiment shown in FIG. 1 and its vicinity with leg shields removed.
Figure 6:
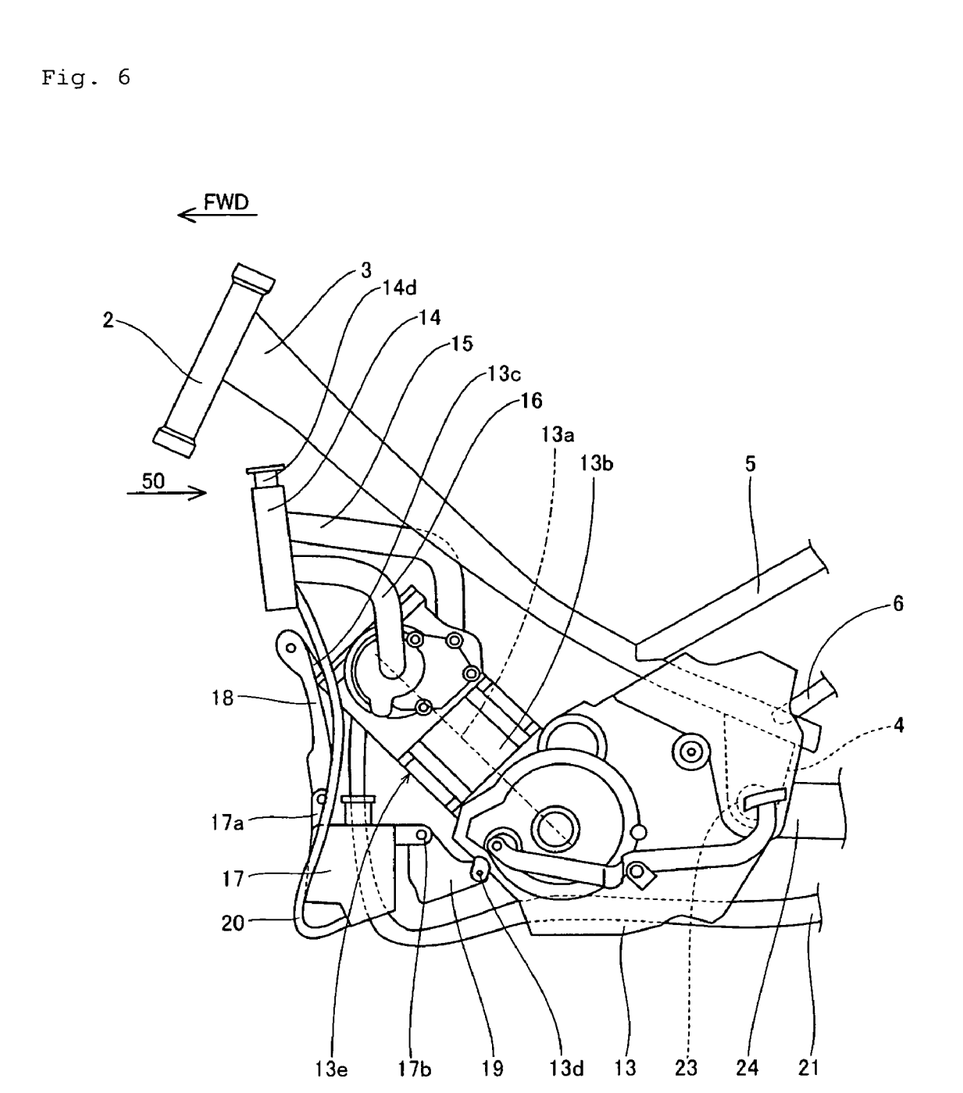
FIG. 6 is a side view showing the engine and its vicinity of the motorcycle, according to the preferred embodiment shown in FIG. 1 with a vehicle cover removed.

According to the present preferred embodiment, a pair of leg shields 29 are provided, as shown in FIGS. 1 to 4, forwardly of the vehicle body cover 27 in the direction (the direction indicated by an arrow FWD) of traveling and with a predetermined spacing therebetween in the widthwise direction (A direction) of the vehicle body to cover the front of a driver's legs. The leg shields 29 are arranged on both sides of the radiator 14 and the reservoir tank 17 in a manner to interpose therebetween the radiator 14 and the reservoir tank 17. That is, as shown in FIGS. 1 and 3, the radiator 14 and the reservoir tank 17 are arranged within the leg shields 29 in a manner to be covered by the leg shields 29 as viewed laterally.

Also, according to the present preferred embodiment, the leg shields 29 have an opening 29a in the front as shown in FIGS. 2 and 4. The radiator 14 within the leg shields 29 is arranged so that a substantially whole region of a front surface of the core part 14c is exposed through the opening 29a of the leg shields 29 and an upper part of the core part 14c is positioned above the front fender 9. Also, the reservoir tank 17 within the leg shields 29 is arranged in a position in which it can be visually recognized through the opening 29a of the leg shields 29 from the front. That is, the opening 29a of the leg shields 29 is provided so that an upper part of the reservoir tank 17 is partially exposed.

Front parts 29b of the pair of leg shields 29 are shaped to converge inward so that a spacing between the left and right front parts 29b in the widthwise direction (A direction) of the vehicle body is decreased as it goes forward. Also, a pair of baffle walls 30 preferably made of a resin, plastic or other suitable material are mounted to the pair of leg shields 29 to conduct the running wind 50 (see FIG. 1) to the radiator 14.

According to the present preferred embodiment, the provision of the reservoir tank 17 in the underbone type motorcycle 1 provided with the main frame 3 which extends downwardly and rearwardly of the head pipe 2 enables temporarily storing increased cooling water in the reservoir tank 17 in the case where the cooling water is increased by virtue of water temperature in the radiator 14 becoming high, and drawing the cooling water from within the reservoir tank 17 to fill the radiator 14 in the case where the cooling water is decreased by virtue of water temperature in the radiator 14 becoming low. As a result, the quantity of cooling water in the radiator 14 can be maintained constant, so that the cooling capacity of the radiator 14 can be kept constant. Also, by arranging the engine 13, which includes the cylinder 13b having the cylinder shaft 13a inclined forward and obliquely upward at the predetermined angle, below the main frame 3, and arranging the reservoir tank 17 below the lower surface 13e of the cylinder 13b of the engine 13, it is possible to prevent outward projection of the reservoir tank 17 from lateral end surfaces of the engine 13 as viewed from the front. Thereby, an increase of the leg shields 29 in length in the widthwise direction (A direction) of the vehicle body can be restricted even when the leg shields 29 are configured such that the reservoir tank 17 is arranged in the leg shields 29.

According to the present preferred embodiment, by arranging the exhaust pipe 21 leftwardly of the center line of the vehicle body in the widthwise direction (A direction) of the vehicle body as viewed from the front, and arranging the reservoir tank 17 rightwardly of the center line of the vehicle body in opposition to a left side on which the exhaust pipe 21 is mounted in the widthwise direction of the vehicle body as viewed from the front, it is possible to prevent the plumbing pipe 20, which connects the radiator 14 and the reservoir tank 17, from overlapping the exhaust pipe 21, so that the plumbing pipe 20 can be readily laid.

According to the present preferred embodiment, by arranging the reservoir tank 17 in a position in which it can be visually recognized through the opening 29a of the leg shields 29 from the front, maintenance of the reservoir tank 17 can be done through the opening 29a of the leg shields 29 without removing the leg shields 29. Also, by making the reservoir tank 17 of a translucent material that affords visually recognizing a quantity of the cooling water stored therein from outside, a quantity of the cooling water stored in the reservoir tank 17 can be readily recognized through the opening 29a of the leg shields 29.

According to the present preferred embodiment, by arranging the radiator 14 within the leg shields 29 so that a substantially whole region of the front surface of the core part 14c is exposed through the opening 29a of the leg shields 29 and the upper portion of the core part 14c is positioned above the front fender 9, the running wind 50 passing through the opening 29a of the leg shields 29 becomes easy to strike on the front surface of the core part 14c of the radiator 14, so that the radiator 14 can be further improved in cooling capacity.

According to the present preferred embodiment, the reservoir tank 17 can be readily fixed within the leg shields 29 by providing the mount parts 17a, 17b, respectively, at the upper end of and the rearward upper end of the reservoir tank 17, and mounting the mount parts 17a, 17b, respectively, to the mount parts 13c, 13d of the engine 13 through the brackets 18, 19.

Also, according to the present preferred embodiment, by arranging the radiator 14 and the reservoir tank 17 so as to be covered by the leg shields 29 as viewed laterally, the leg shields 29 can inhibit objects such as pebbles, etc. coming from the side and striking against the radiator 14 and the reservoir tank 17.

In addition, it should be considered that the preferred embodiments disclosed herein are illustrative in all respects and not limiting. The scope of the present invention is indicated not by the description of the preferred embodiments but the claims, and covers all modifications within the meaning and the range equivalent to the claims.

For example, while the preferred embodiments relate to an underbone type motorcycle, of which a main frame is small in height, the present invention is not limited thereto but applicable to vehicles other than motorcycles, such as a tricycle, ATV (All Terrain Vehicle; rough terrain traveling vehicle), etc., provided that such vehicles include an underbone type vehicle provided with a heat exchanger for cooling an engine.

While preferred embodiments have been shown with respect to the case where a radiator with the tanks arranged on both sides of the core part is used, the present invention is not limited thereto but a radiator with tanks arranged above and below a core part may be used. In this case, a reservoir tank is connected through a plumbing pipe to a cap provided on that tank, which is arranged above or below the core part.

Also, while the lower end of the radiator in the preferred embodiments is preferably arranged above the lower surface of the cylinder of the engine, the present invention is not limited thereto but a lower end of a radiator may be arranged below a lower surface of a cylinder of an engine. In this case, the lower end of the radiator and an upper end of a reservoir tank may overlap each other as viewed laterally.

While according to the preferred embodiments, the reservoir tank is mounted rightwardly of the center line of the vehicle body in the widthwise direction (A direction) of the vehicle body and the exhaust pipe is mounted leftwardly of the center line of the vehicle body in the widthwise direction (A direction) of the vehicle body as viewed from the front, the present invention is not limited thereto but it suffices that the reservoir tank be arranged on an opposite side of the center line of the vehicle body to a side, on which the exhaust pipe is arranged, in the widthwise direction of the vehicle body as viewed from the front.

Also, according to the preferred embodiments, the reservoir tank is preferably made of a translucent material, the present invention is not limited thereto but the reservoir tank may be made of other materials than a translucent material provided that the materials afford visually recognizing a quantity of cooling water stored in the reservoir tank from outside.

What is claimed is:

1. A vehicle comprising:
    a head pipe;
    a frame connected to the head pipe to extend rearwardly and downwardly;
    an engine arranged below the frame and including a cylinder having a cylinder axis which is inclined forwardly and obliquely upward at a predetermined angle;
    a leg shield for covering a front side of the legs of a driver of the vehicle;

a heat exchanger arranged within the leg shield to cool the engine;

a reservoir tank arranged below a lower surface of the cylinder of the engine, the reservoir tank located within the leg shield and connected to the heat exchanger; and an exhaust pipe connected to the engine and arranged on one side of a center line of the vehicle in a widthwise direction of the vehicle as viewed from the front;

wherein the reservoir tank is arranged on a side of the center line of the vehicle opposite to the one side of the center line on which the exhaust pipe is arranged.

2. The vehicle according to claim 1, wherein the heat exchanger comprises a core part over which a running wind passes, a pair of tanks arranged with a predetermined spacing therebetween in the widthwise direction of the vehicle so as to interpose therebetween the core part, and a cap provided on one of the tanks, the cap being arranged on one side of the center line of the vehicle in the widthwise direction of the vehicle, and the reservoir tank arranged on the other side in the widthwise direction of the vehicle is connected through a pipe to the cap of the heat exchanger arranged on the one side in the widthwise direction of the vehicle.

3. The vehicle according to claim 1, further comprising a front fender that covers an upper portion of a front wheel, and wherein at least a part of the heat exchanger is positioned above the front fender.

4. The vehicle according to claim 1, wherein the heat exchanger is arranged below the frame.

5. The vehicle according to claim 1, further comprising a mount member that mounts the reservoir tank on the engine.

6. The vehicle according to claim 1, wherein the heat exchanger and the reservoir tank are arranged so as to be covered by the leg shield as viewed laterally.

7. A vehicle comprising:

a head pipe;

a frame connected to the head pipe to extend rearwardly and downwardly;

an engine arranged below the frame and including a cylinder having a cylinder axis which is inclined forwardly and obliquely upward at a predetermined angle;

a leg shield for covering a front side of the legs of a driver of the vehicle;

a heat exchanger arranged within the leg shield to cool the engine; and a reservoir tank arranged below a lower surface of the cylinder of the engine, the reservoir tank located within the leg shield and connected to the heat exchanger;

wherein the leg shield comprises an opening on a front side thereof, and the reservoir tank is arranged in a position in which it can be visually recognized through the opening of the leg shield as viewed from the front of the vehicle.

8. The vehicle according to claim 7, wherein the heat exchanger comprises a core part, over which a running wind passes, and the opening of the leg shield is provided so as to expose a portion of the reservoir tank and substantially a whole region of a front surface of the core part of the heat exchanger to the running wind.

9. The vehicle according to claim 7, wherein the heat exchanger comprises a core part over which a running wind passes, a pair of tanks arranged with a predetermined spacing therebetween in the widthwise direction of the vehicle so as to interpose therebetween the core part, and a cap provided on one of the tanks, the cap being arranged on one side of the center line of the vehicle in the widthwise direction of the vehicle, and the reservoir tank arranged on the other side in the widthwise direction of the vehicle is connected through a pipe to the cap of the heat exchanger arranged on the one side in the widthwise direction of the vehicle.

10. The vehicle according to claim 7, further comprising a front fender that covers an upper portion of a front wheel, and wherein at least a part of the heat exchanger is positioned above the front fender.

11. The vehicle according to claim 7, wherein the heat exchanger is arranged below the frame.

12. The vehicle according to claim 7, further comprising a mount member that mounts the reservoir tank on the engine.

13. The vehicle according to claim 7, wherein the heat exchanger and the reservoir tank are arranged so as to be covered by the leg shield as viewed laterally.

* * * * *